United States Patent
Suzuki et al.

(10) Patent No.: US 10,065,219 B2
(45) Date of Patent: Sep. 4, 2018

(54) POWER-OPERATED AIR PROPELLING WORK APPARATUS

(71) Applicant: MAKITA CORPORATION, Aichi (JP)

(72) Inventors: Daisuke Suzuki, Aichi (JP); Yuki Koide, Aichi (JP)

(73) Assignee: MAKITA CORPORATION, Aichi (JP)

( * ) Notice: Subject to any disclaimer, the term of this patent is extended or adjusted under 35 U.S.C. 154(b) by 445 days.

(21) Appl. No.: 14/873,388

(22) Filed: Oct. 2, 2015

(65) Prior Publication Data

US 2016/0107202 A1 Apr. 21, 2016

(30) Foreign Application Priority Data

Oct. 21, 2014 (JP) .................. 2014-214687

(51) Int. Cl.
| | |
|---|---|
| *E01H 1/08* | (2006.01) |
| *B08B 5/02* | (2006.01) |
| *A01G 20/43* | (2018.01) |
| *A01G 1/12* | (2006.01) |
| *A47L 5/14* | (2006.01) |
| *A47L 9/24* | (2006.01) |

(52) U.S. Cl.
CPC ............. *B08B 5/02* (2013.01); *A01G 1/125* (2013.01); *A01G 20/43* (2018.02); *E01H 1/0809* (2013.01); *A47L 5/14* (2013.01); *A47L 9/248* (2013.01); *E01H 1/08* (2013.01)

(58) Field of Classification Search
CPC B08B 5/02; E01H 1/0809; E01H 1/08; A47L 5/14; A47L 9/248; A47L 9/2889
See application file for complete search history.

(56) References Cited

U.S. PATENT DOCUMENTS

| | | | |
|---|---|---|---|
| 2013/0047371 A1* | 2/2013 | Namekata | A01G 1/125 15/414 |
| 2014/0140861 A1* | 5/2014 | Pellenc | A01G 1/125 417/44.1 |

FOREIGN PATENT DOCUMENTS

| | | |
|---|---|---|
| JP | 11-148122 | 6/1999 |
| JP | 2014-036939 | 2/2014 |
| JP | 2014-511953 | 5/2014 |

* cited by examiner

*Primary Examiner* — Michael Jennings
(74) *Attorney, Agent, or Firm* — Greenblum & Bernstein, P.L.C.

(57) ABSTRACT

A power-operated air propelling work apparatus includes: an air flow pipe including an air inlet opening, an air outlet opening and a pipe wall formed between the air inlet opening and the air outlet opening to define an air flow passageway inside the pipe wall; an electric air propelling fan disposed within the air flow passageway for sucking in air from the air inlet opening and blowing out air from the air outlet opening; an apparatus housing surrounding and supporting the air flow pipe and forming a housing space between the apparatus housing and the air flow pipe; and a control circuit unit disposed within the housing space for controlling an operation of the electric air propelling fan, wherein the pipe wall is formed with an air passage hole by which the air flow passageway and the housing space communicate with each other.

12 Claims, 5 Drawing Sheets

POWER-OPERATED AIR PROPELLING WORK APPARATUS

TECHNICAL FIELD

The present invention relates to a power-operated air propelling work apparatus such as a blower apparatus or a dust collector apparatus, and more particularly to a motor-driven air blowing work apparatus provided with a configuration for causing the air in the apparatus housing to flow around the control circuit unit which controls the operation of the work apparatus and is disposed within the housing space, so that the control circuit unit will be cooled.

BACKGROUND INFORMATION

Portable blower apparatuses and dust collector apparatus (or blower/suction apparatuses) have been conventionally known and widely used for blowing off or sucking in fallen leaves or dusts on the ground or the like to clean the place. A relatively small-sized example of hand-held blower apparatuses is disclosed in JP 2014-36939 A, in which the blower apparatus is mounted with a battery and utilizes an electric motor energized by the battery power. This hand-held blower apparatus consumes relatively small electric power and seldom encounters a trouble with heat generation at the control circuit unit which controls the operation of the blower apparatus, and the control circuit unit is disposed at a convenient position within the housing space without employing any particular contrivance for cooling the control circuit unit. A relatively large-sized example of hand-held blower apparatuses is disclosed in JP 2014-511953 A (PCT entry), equivalent to US 2014/0140861 A1, in which a separate battery is piggybacked by means of a harness H for supplying electric power from the battery to an electric motor. This blower apparatus includes a configuration for cooling the control circuit unit, in which an exterior housing 17 and an interior housing 18 are linked by radial rectifier fins 9 to provide cooling air circulation channels 19, and a control circuit unit (electronic board 10) is attached on a support plate 21 that is integral with the exterior housing 17.

SUMMARY OF THE INVENTION

In view of the foregoing circumstances, therefore, it is a primary object of the present invention to provide a power-operated air propelling work apparatus such as a blower apparatus, in which a control circuit unit is conveniently cooled with a simple configuration for causing air flow around the control circuit unit disposed within the apparatus housing by utilizing pressure differences generated by the air propelling fan, and without providing any complicated structure particularly for cooling the control circuit unit.

According to the present invention, the object is accomplished by providing a power-operated air propelling work apparatus comprising: an air flow pipe including an air inlet opening, an air outlet opening and a pipe wall formed between the air inlet opening and the air outlet opening to define an air flow passageway inside the pipe wall; an electric air propelling fan disposed within the air flow passageway for sucking in air from the air inlet opening and blowing out air from the air outlet opening; an apparatus housing surrounding and supporting the air flow pipe and forming a housing space between the apparatus housing and the air flow pipe; and a control circuit unit disposed within the housing space for controlling an operation of the electric air propelling fan, wherein the pipe wall is formed with an air passage hole by which the air flow passageway and the housing space communicate with each other for causing an air flow through the air passage hole due to air pressure differences between the air flow passageway and the housing space so that air in the housing space is urged to flow around the control circuit unit.

According to the present invention, the electric air propelling fan may preferably be an axial fan.

According to the present invention, the pipe wall may preferably be formed with a first air passage hole and a second air passage hole, the first air passage hole being formed downstream of the electric air propelling fan and the second air passage hole being formed upstream of the electric air propelling fan.

According to the present invention, the pipe wall may preferably be formed with a first air passage hole and a second air passage hole, the first air passage hole being formed upstream of the electric air propelling fan and the second air passage hole being formed also upstream of the electric air propelling fan and downstream of the first air passage hole.

According to the present invention, the pipe wall may preferably be formed with a first air passage hole and a second air passage hole, the first air passage hole being formed downstream of the electric air propelling fan and the second air passage hole being formed also downstream of the electric air propelling fan and further downstream of the first air passage hole.

According to the present invention, the pipe wall may preferably be formed with a first air passage hole upstream of the electric air propelling fan, and the apparatus housing is formed with a second air passage hole by which the housing space and a space outside the apparatus housing communicate with each other.

According to the present invention, the pipe wall may preferably be formed with a first air passage hole downstream of the electric air propelling fan, and the apparatus housing is formed with a second air passage hole by which the housing space and a space outside the apparatus housing communicate with each other.

With a power-operated air propelling apparatus configured as above in which the air pressure differences generated by the air propelling fan are partly utilized to cause air flow around the control circuit unit disposed within the housing space so that the heat which may be generated by the control circuit unit will be dissipated by means of a simple configuration.

BRIEF DESCRIPTION OF THE DRAWINGS

For a better understanding of the present invention, and to show how the same may be practiced and will work, reference will now be made, by way of example, to the accompanying drawings, in which.

DETAILED DESCRIPTION OF EMBODIMENTS OF THE INVENTION

The invention and its embodiments can now be better understood by turning to the following detailed description of the preferred embodiments of power-operated air propelling apparatuses with reference to the accompanying drawings. The invention will hereunder be described about a hand-held blower apparatus in which the configuration according to the present invention is practiced. It should be understood, however, that the configuration according to the present invention is applicable not only to a hand-held blower apparatus, but also to a backpack blower apparatus. Further, the invention is also applicable to a dust collector apparatus and a blower/suction apparatus of a hand-held type or a backpack type.

Figure 1:
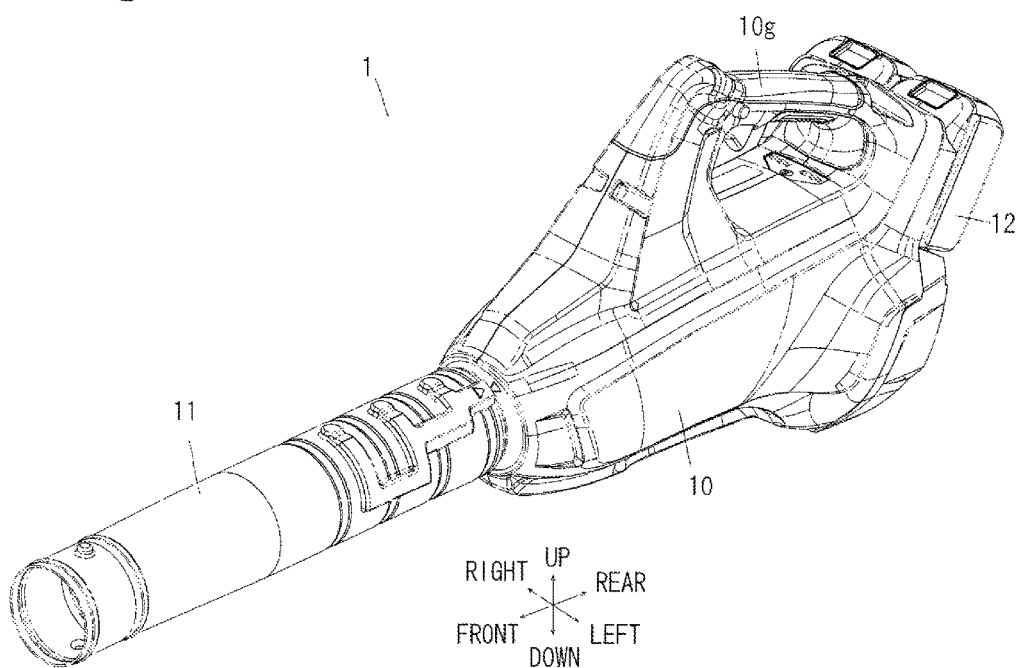
FIG. 1 is a perspective view, showing a general appearance as seen from the front left side, of a hand-held blower apparatus as an embodiment of the power-operated air propelling work apparatus according to the present invention.
Figure 2:
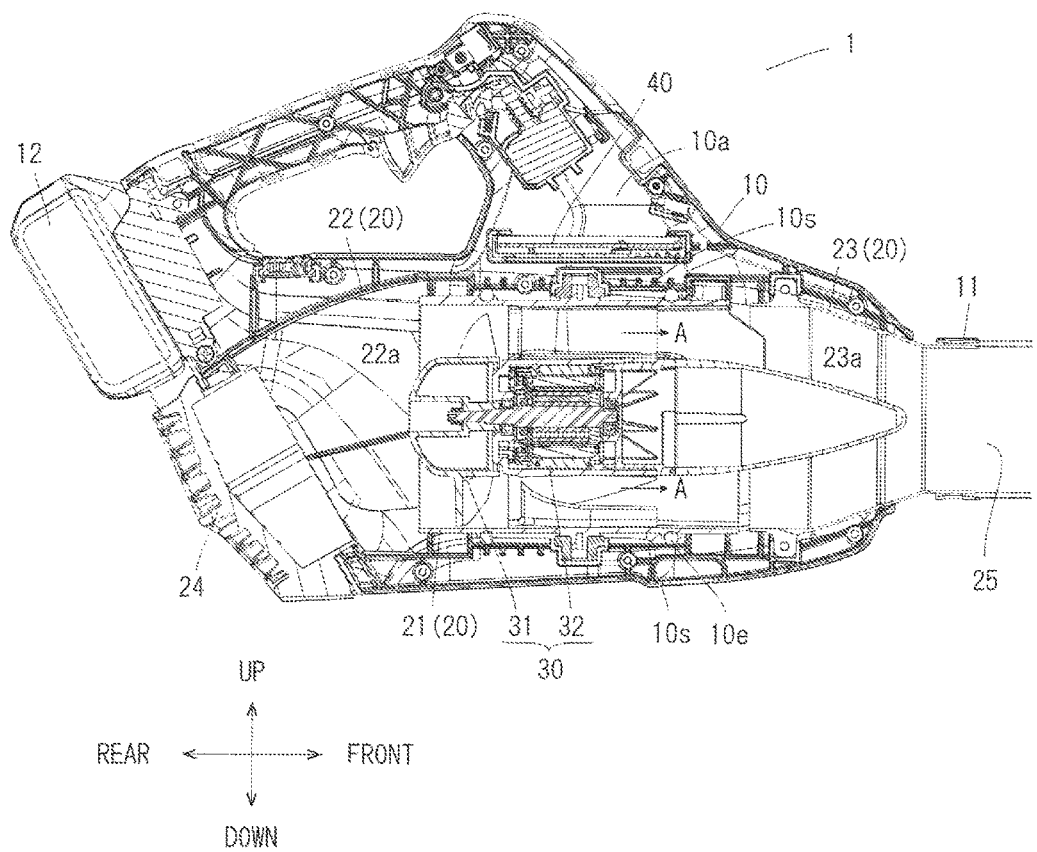
FIG. 2 is a vertical cross-sectional right side view of the main part of the blower apparatus shown in FIG. 1.

FIG. 1 shows a general appearance as seen from the front left side of a hand-held blower apparatus as an embodiment of the power-operated air propelling work apparatus according to the present invention, and FIG. 2 shows an internal structure in a vertical cross-sectional right side view of the main part of the same blower apparatus, which comprises an air propelling fan energized by an electric motor and employs a configuration for cooling the control circuit unit. As shown in FIG. 1, the blower apparatus 1 comprises an apparatus housing 10 containing an air propelling fan driven by an electric motor inside, a blow-off tube 11 coupled to the front end of the apparatus housing 10, and a battery 12 mounted at the rear end of the apparatus housing 10. The apparatus housing 10 is integrally formed with a grip handle 10g at the upper part thereof for the user to hold by his/her hand.

Within the apparatus housing 10 are provided, as shown in FIG. 2, a central part air flow pipe 21 of a tubular shape and an electric air propelling fan 30 supported coaxially within the central part air flow pipe 21 by supporting means, the electric air propelling fan 30 comprising propeller blades 31 and an electric motor 32 driving the propeller blades 31, and the central part air flow pipe 21 and the electric air propelling fan 30 constituting an air propelling unit which propels air in the direction of arrows A. In the illustrated embodiment, the electric air propelling far 30 is a coaxial fan, which is a preferable type for the invention. The central part air flow pipe 21 is supported via elastic ring members 10e on a tubular supporting member 10s which is integrally formed with the apparatus housing 10, and is surrounded by the apparatus housing 10. To the rear end of the tubular supporting member 10s is connected an inlet part air flow pipe 22 formed as an integral member of the apparatus housing 10 in the entrance side (rear side) of the central part air flow pipe 21. To the front end of the tubular supporting member 10s is connected an outlet part air flow pipe 23 in the exit side (front side) of the central part air flow pipe 21. The central part air flow pipe 21, the inlet part air flow pipe 22 and the outlet part air flow pipe 23 together constitute a tubular air flow pipe 20 internally forming a continuous air flow passageway, with a housing space 10a provided between the apparatus housing 10 and the air flow pipe 20. A control circuit unit 40 for controlling the operation of the electric air propelling fan 30 is disposed within the housing space 10a. The entrance portion of the air flow pipe 20 forms an air inlet opening 24, and the exit portion of the air flow pipe 20 forms an air outlet opening 25 having a structure to be coupled to the blow-off tube 11. As the electric air propelling fan 30 operates, air is sucked in from the air inlet opening 24 and blown out from the air outlet opening 25. Under this condition, the air pressure in the pipe interior space 22a on the air passageway within the inlet part air flow pipe 22 (and part of the central part air flow pipe 21 upstream of the air propelling far 30) is lower than the air pressure in the housing space 10a and that in the atmosphere outside the apparatus housing 10, while air pressure in the pipe interior space 23a on the air passageway within the outlet part air flow pipe 23 (and part of the central part air flow pipe 21 downstream of the air propelling far 30) is higher than the air pressure in the housing space 10a and that in the atmosphere outside the apparatus housing 10.

Figure 3:
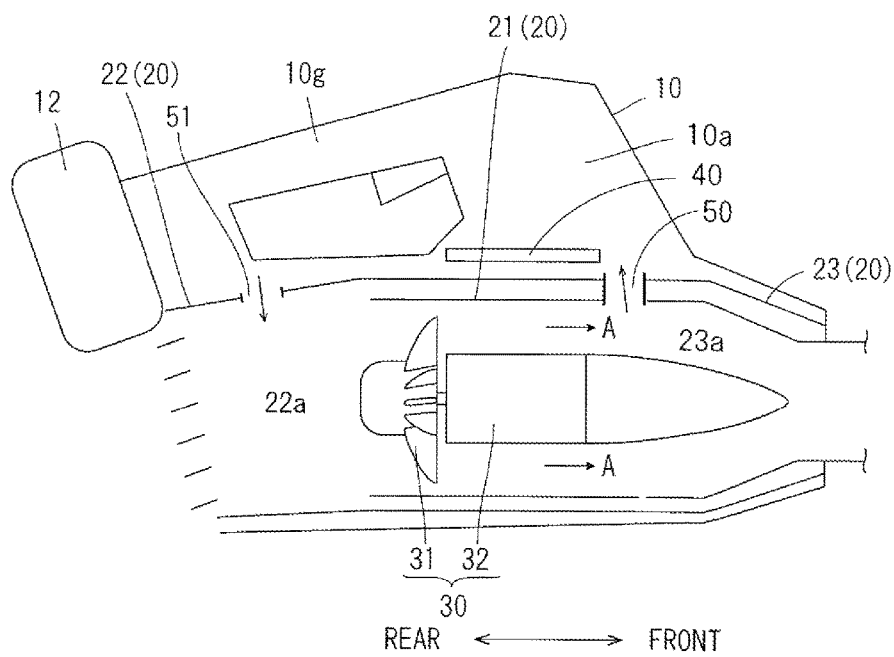
FIG. 3 is a vertical cross-sectional right side view schematically showing a configuration of a first embodiment including structural elements which relate to the cooling of the control circuit unit in the part shown in FIG. 2 of the blower apparatus.

Hereinafter will be described a configuration for cooling the control circuit unit as contrived by the present invention. FIG. 3 is to schematically depict the part shown in FIG. 2 of the blower apparatus employing the first embodiment of the present invention. In FIG. 3, in order to schematically depict the structure in outline, the members having a thickness are represented by single solid lines in place of two thin parallel lines crosshatched in-between representing the two surfaces and the body, and air passage holes are each indicated by short orthogonal solid lines positioned at the edges of the holes. In FIG. 3, the control circuit unit 40 is disposed within the housing space 10a at a position above the electric air propelling fan 30. In this embodiment, an air passage hole 50 is formed on the air flow pipe 20 at a position toward the front of the control circuit unit 40 to connect the pipe interior space 23a downstream of the electric air propelling fan 30 (i.e. the propeller blades 31) with the housing space 10a, and an air passage hole 51 is formed on the air flow pipe 20 at a position toward the rear of the control circuit unit 40 to connect the pipe interior space 22a upstream of the electric air propelling fan 30 with the housing space 10a. With this configuration, air flows through the air passage hole 50 from the pipe interior space 23a with a positive (higher) pressure to the housing space 10a, and air flows through the air passage hole 51 from the housing space 10a to the pipe interior space 22a with a negative (lower) pressure, and thus the air within the housing space 10a moves around (i.e. flows by) the control circuit unit 40, thereby cooling the control circuit unit 40.

Figure 4:
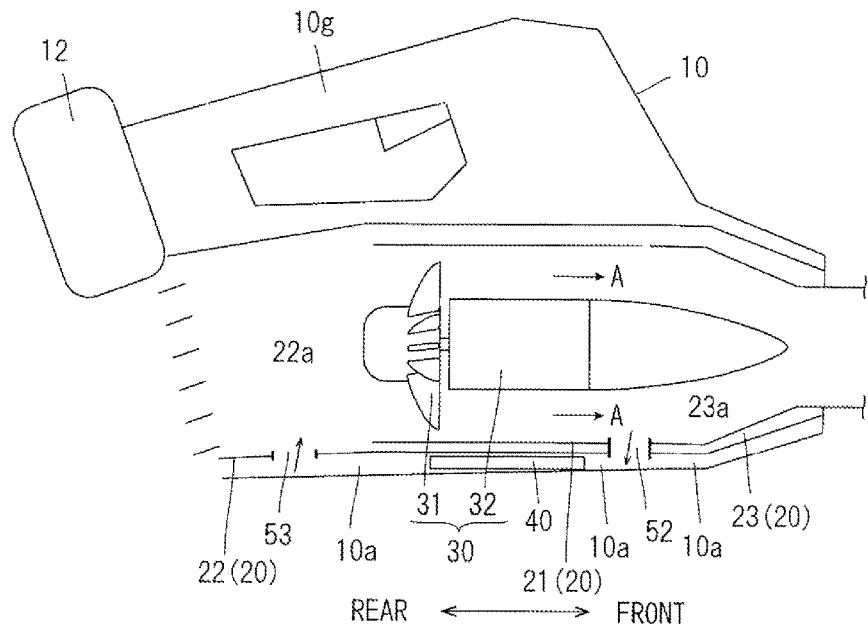
FIG. 4 is a vertical cross-sectional right side view schematically showing a configuration of a second embodiment including structural elements which relate to the cooling of the control circuit unit in the part shown in FIG. 2 of the blower apparatus.

FIG. 4 depicts schematically the part shown in FIG. 2 of the blower apparatus employing the second embodiment of the present invention. In FIG. 4, the control circuit unit 40 is disposed within the housing space 10a at a position below the electric air propelling fan 30. In this embodiment, an air passage hole 52 is formed on the air flow pipe 20 at a position toward the front of the control circuit unit 40 to connect the pipe interior space 23a downstream of the electric air propelling fan 30 with the housing space 10a, and an air passage hole 53 is formed on the air flow pipe 20 at a position toward the rear of the control circuit unit 40 to connect the pipe interior space 22a upstream of the electric air propelling fan 30 with the housing space 10a. With this configuration, air flows through the air passage hole 52 from the pipe interior space 23a with a positive pressure to the housing space 10a, and air flows through the air passage hole 53 from the housing space 10a to the pipe interior space 22a with a negative pressure, and thus the air within the housing space 10a moves around (i.e. flows by) the control circuit unit 40, thereby cooling the control circuit unit 40.

Figure 5:
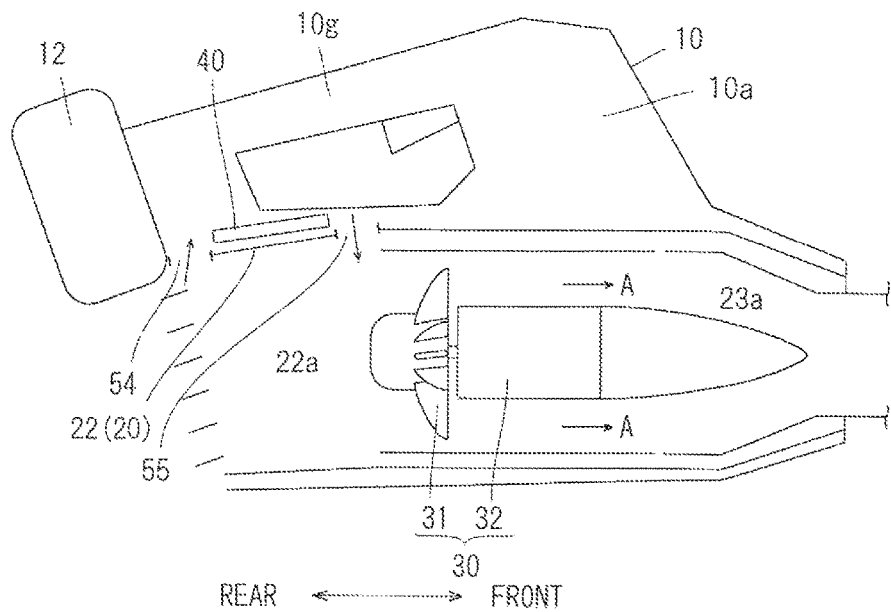
FIG. 5 is a vertical cross-sectional right side view schematically showing a configuration of a third embodiment including structural elements which relate to the cooling of the control circuit unit in the part shown in FIG. 2 of the blower apparatus.

FIG. 5 depicts schematically the part shown in FIG. 2 of the blower apparatus employing the third embodiment of the present invention. In FIG. 5, the control circuit unit 40 is disposed within the housing space 10a at a position above the pipe interior space 22a. In this embodiment, an air passage hole 54 is formed on the air flow pipe 20 at a position toward the rear of the control circuit unit 40 to connect the pipe interior space 22a upstream of the electric air propelling fan 30 with the housing space 10a, and an air passage hole 55 is formed on the air flow pipe 20 at a position toward the front of the control circuit unit 40 to connect the pipe interior space 22a downstream of the air passage hole 54 with the housing space 10a. With this configuration, air flows through the air passage hole 54 from the part of the pipe interior space 22a with a less negative pressure to the housing space 10a, and air flows through the air passage hole 55 from the housing space 10a to the pipe interior space 22a with a more negative pressure downstream of the air passage hole 54, and thus the air within the housing space 10a moves around (i.e. flows by) the control circuit unit 40, thereby cooling the control circuit unit 40.

Figure 6:
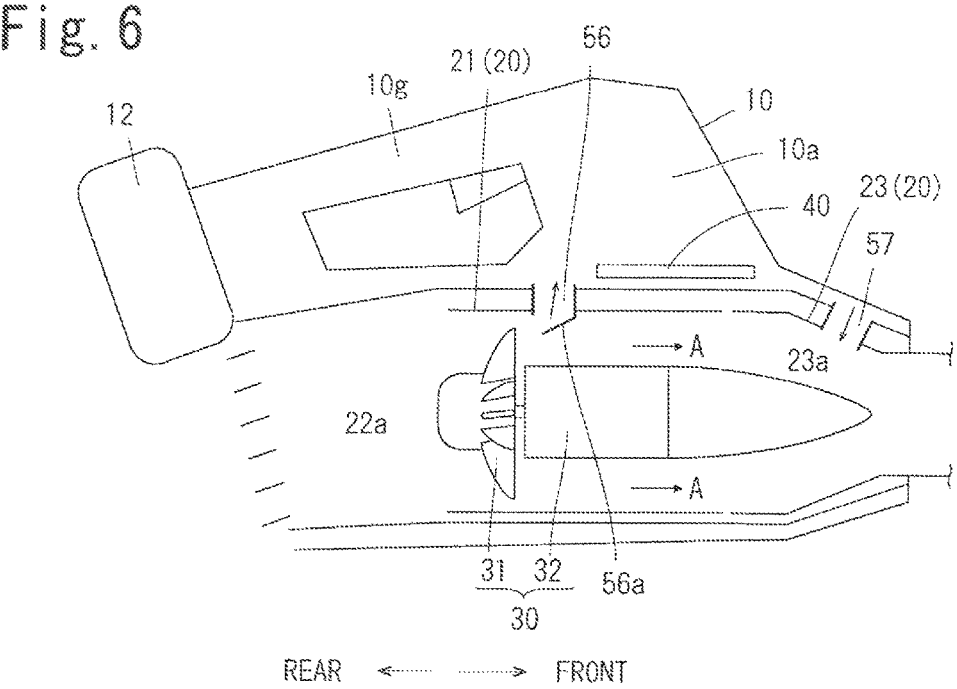
FIG. 6 is a vertical cross-sectional right side view schematically showing a configuration of a fourth embodiment including structural elements which relate to the cooling of the control circuit unit in the part shown in FIG. 2 of the blower apparatus.

FIG. 6 depicts schematically the part shown in FIG. 2 of the blower apparatus employing the fourth embodiment of the present invention. In FIG. 6, the control circuit unit 40 is disposed within the housing space 10a at a position above the pipe interior space 23a. In this embodiment, an air passage hole 56 is formed on the air flow pipe 20 at a position toward the rear of the control circuit unit 40 to connect the upstream portion of the pipe interior space 23a with the housing space 10a, and an air passage hole 57 is formed on the air flow pipe 20 at a position toward the front of the control circuit unit 40 to connect the pipe interior space 23a downstream of the electric air propelling fan 30 and downstream of the air passage hole 56 with the housing space 10a With this configuration, air flows through the air passage hole 56 from the upstream part of the pipe interior space 23a with a more positive pressure to the housing space 10a, and air flows through the air passage hole 57 from the housing space 10a to the downstream pipe interior space 23a with a less positive pressure downstream of the air passage hole 56, and thus the air within the housing space 10a moves around (i.e. flows by) the control circuit unit 40, thereby cooling the control circuit unit 40. In this embodiment, a slant air flow guide 56a as schematically depicted is projected from the downstream edge of the air passage hole 56 into the pipe interior space 23a to more effectively introduce air through the air passage hole 56.

Figure 7:
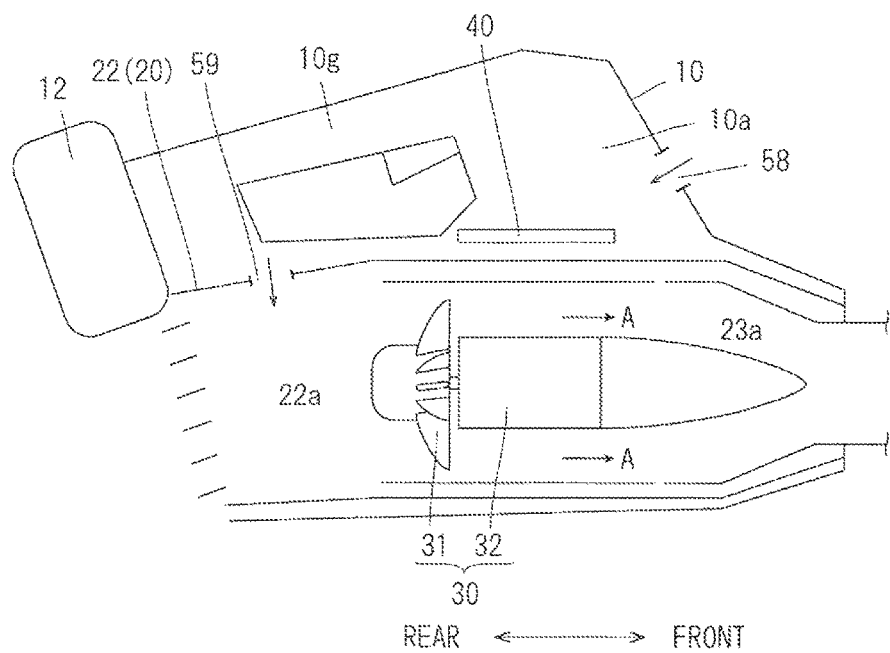
FIG. 7 is a vertical cross-sectional right side view schematically showing a configuration of a fifth embodiment including structural elements which relate to the cooling of the control circuit unit in the part shown in FIG. 2 of the blower apparatus.

FIG. 7 depicts schematically the part shown in FIG. 2 of the blower apparatus employing the fifth embodiment of the present invention. In FIG. 7, the control circuit unit 40 is disposed within the housing space 10a at a position above the electric air propelling fan 30 as in the case of FIG. 3. In this embodiment, an air passage hole 58 is formed on the outer shell of the apparatus housing 10 at a position above and toward the front of the control circuit unit 40 to connect the housing space 10a with the outer space of the apparatus housing 10, and an air passage hole 59 is formed on the air flow pipe 20 at a position toward the rear of the control circuit unit 40 to connect the pipe interior space 22a upstream of the electric air propelling fan 30 with the housing space 10a. With this configuration, air flows through the air passage hole 59 from the housing space 10a to the pipe interior space 22a with a negative pressure, and air flows through the air passage hole 58 from the outer space of the apparatus housing 10 into the housing space 10a to compensate the air pulled out through the air passage hole 59, and thus the air within the housing space 10a moves around (i.e. flows by) the control circuit unit 40, thereby cooling the control circuit unit 40.

Figure 8:
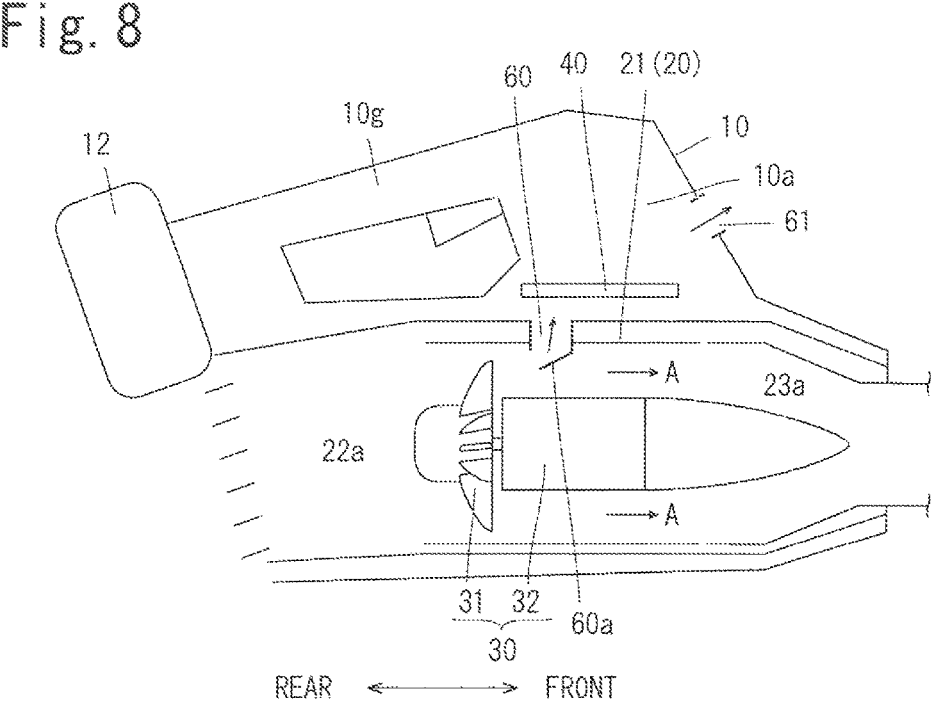
FIG. 8 is a vertical cross-sectional right side view schematically showing a configuration of a sixth embodiment including structural elements which relate to the cooling of the control circuit unit in the part shown in FIG. 2 of the blower apparatus.

FIG. 8 depicts schematically the part shown in FIG. 2 of the blower apparatus employing the sixth embodiment of the present invention. In FIG. 8, the control circuit unit 40 is disposed within the housing space 10a at a position above the electric air propelling fan 30. In this embodiment, an air passage hole 60 is formed on the air flow pipe 20 at a position near the rear of the control circuit unit 40 to connect the pipe interior space 23a downstream of the propeller blades 31 with the housing space 10a, and an air passage hole 61 is formed on the outer shell of the apparatus housing 10 at a position above and toward the front of the control circuit unit 40 to connect the housing space 10a with the outer space of the apparatus housing 10. With this configuration, air flows through the air passage hole 60 from the pipe interior space 23a with a positive pressure to the housing space 10a, and air flows through the air passage hole 61 from the housing space 10a to the outer space of the apparatus housing 10, and thus the air within the housing space 10a moves around (i.e. flows by) the control circuit unit 40, thereby cooling the control circuit unit 40. In this embodiment, a slant air flow guide 60a as schematically depicted is projected from the downstream edge of the air passage hole 60 into the pipe interior space 23a to more effectively introduce air through the air passage hole 60.

While axial fans are employed as the electric air propelling fans in the heretofore illustrated and described embodiments, the invention is not necessarily limited thereto but other types of fans can also be employed such as a centrifugal fan.

While the invention has been described about the embodiments of a power-operated blower apparatus, the invention is also applicable to a power-operated dust collector apparatus, in which the configuration according to the present invention for cooling the control circuit unit can be employed.

As will be understood from the above description, the present invention makes good use of the pressure differences caused by the air propelling fan to cause air flow in the housing space where the control circuit unit is disposed, which means a simple configuration serves to cool the control circuit unit. The present invention will be useful where the trend in hand-held power-operated air propelling work apparatuses is toward larger size.

What is claimed is:
1. A power-operated air propelling work apparatus comprising:

an air flow pipe including an air inlet opening, an air outlet opening and a pipe wall formed between the air inlet opening and the air outlet opening to define an air flow passageway inside the pipe wall;

an electric air propelling fan disposed within the air flow passageway for sucking in air from the air inlet opening and blowing out air from the air outlet opening;

an apparatus housing surrounding and supporting the air flow pipe and forming a housing space between the apparatus housing and the air flow pipe; and a control circuit unit disposed within the housing space for controlling an operation of the electric air propelling fan, wherein the pipe wall is formed with at least one air passage hole by which the air flow passageway and the housing space communicate with each other for causing an air flow through the air passage hole due to air pressure differences between the air flow passageway and the housing space so that air in the housing space is urged to flow around the control circuit unit.

2. The power-operated air propelling work apparatus as claimed in claim 1, wherein the electric air propelling fan is an axial fan.

3. The power-operated air propelling work apparatus as claimed in claim 2, wherein the at least one air passage hole includes a first air passage hole and a second air passage hole, the first air passage hole being formed downstream of the electric air propelling fan and the second air passage hole being formed upstream of the electric air propelling fan.

4. The power-operated air propelling work apparatus as claimed in claim 2, wherein the at least one air passage hole includes a first air passage hole and a second air passage hole, the first air passage hole being formed upstream of the electric air propelling fan and the second air passage hole being formed upstream of the electric air propelling fan and downstream of the first air passage hole.

5. The power-operated air propelling work apparatus as claimed in claim 2, wherein the at least one air passage hole includes a first air passage hole and a second air passage hole, the first air passage hole being formed downstream of the electric air propelling fan and the second air passage hole being formed downstream of the electric air propelling fan and further downstream of the first air passage hole.

6. The power-operated air propelling work apparatus as claimed in claim 2, wherein the at least one air passage hole includes a first air passage hole upstream of the electric air propelling fan, and the apparatus housing is formed with a second air passage hole by which the housing space and a space outside the apparatus housing communicate with each other.

7. The power-operated air propelling work apparatus as claimed in claim 2, wherein the at least one air passage hole includes a first air passage hole downstream of the electric air propelling fan, and the apparatus housing is formed with a second air passage hole by which the housing space and a space outside the apparatus housing communicate with each other.

8. The power-operated air propelling work apparatus as claimed in claim 1, wherein the at least one air passage hole includes a first air passage hole and a second air passage hole, the first air passage hole being formed downstream of the electric air propelling fan and the second air passage hole being formed upstream of the electric air propelling fan.

9. The power-operated air propelling work apparatus as claimed in claim 1, wherein the at least one air passage hole includes a first air passage hole and a second air passage hole, the first air passage hole being formed upstream of the electric air propelling fan and the second air passage hole being formed upstream of the electric air propelling fan and downstream of the first air passage hole.

10. The power-operated air propelling work apparatus as claimed in claim 1, wherein the at least one air passage hole includes a first air passage hole and a second air passage hole, the first air passage hole being formed downstream of the electric air propelling fan and the second air passage hole being formed downstream of the electric air propelling fan and further downstream of the first air passage hole.

11. The power-operated air propelling work apparatus as claimed in claim 1, wherein the at least one air passage hole includes a first air passage hole upstream of the electric air propelling fan, and the apparatus housing is formed with a second air passage hole by which the housing space and a space outside the apparatus housing communicate with each other.

12. The power-operated air propelling work apparatus as claimed in claim 1, wherein the at least one air passage hole includes a first air passage hole downstream of the electric air propelling fan, and the apparatus housing is formed with a second air passage hole by which the housing space and a space outside the apparatus housing communicate with each other.

* * * * *